April 26, 1927.  W. E. WHITE  1,625,838
SUPPORT AND SPACER FOR BARS
Filed April 5, 1926
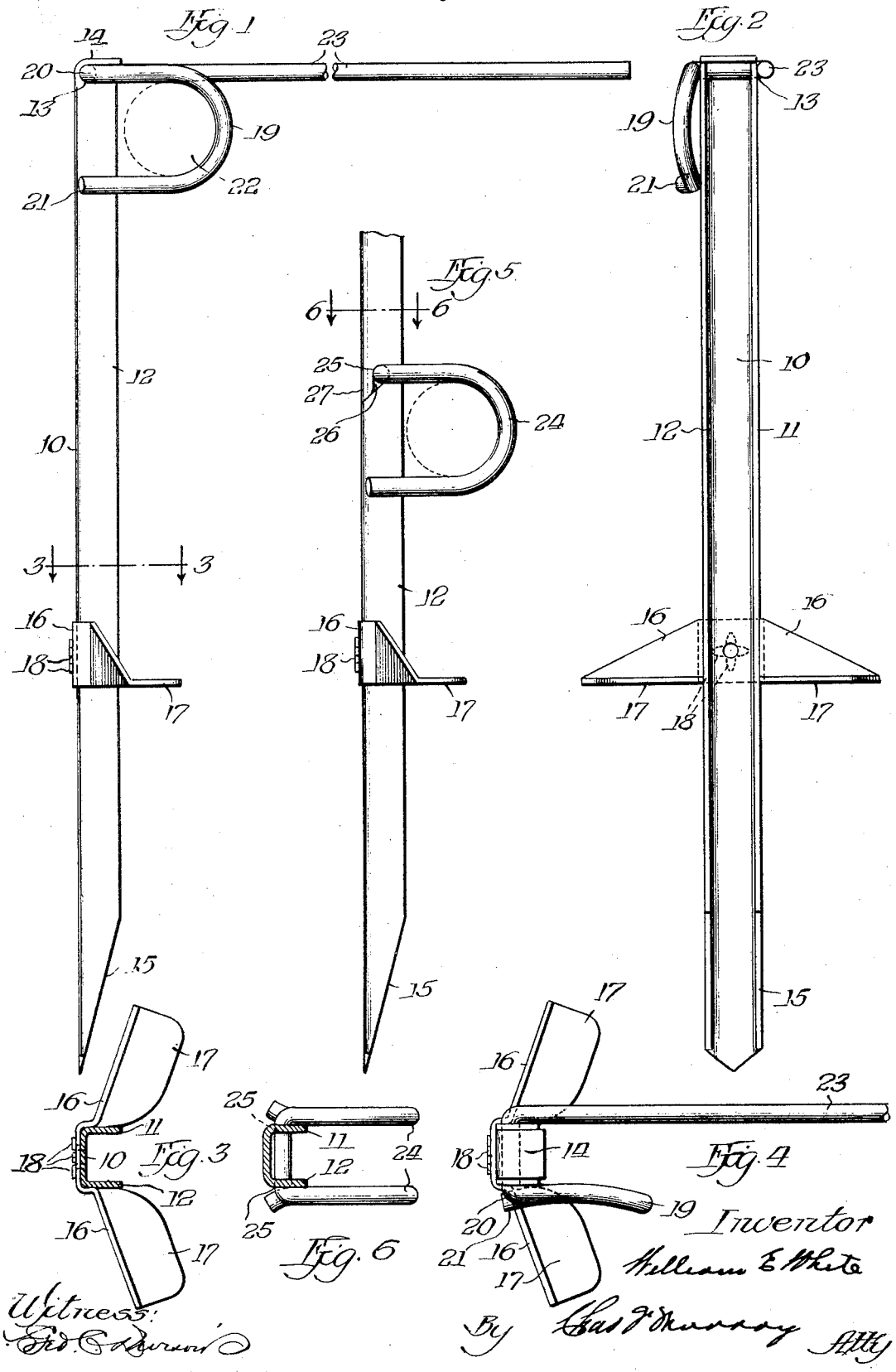
Inventor
William E. White
By Chas. F. Murray Atty.

Patented Apr. 26, 1927.

1,625,838

UNITED STATES PATENT OFFICE.

WILLIAM E. WHITE, OF CHICAGO, ILLINOIS, ASSIGNOR TO KALMAN STEEL COMPANY, OF CHICAGO, ILLINOIS, A CORPORATION OF DELAWARE.

SUPPORT AND SPACER FOR BARS.

Application filed April 5, 1926. Serial No. 99,913.

My invention relates to accessories for concrete roadways and particularly to a novel bar support and spacer, similar in some respects to those disclosed in my co-pending applications Serial Nos. 66,750 and 93,916 filed November 4, 1925 and March 11, 1926, respectively.

An object of the improvement here disclosed is to provide a device of extreme simplicity, one that may be cheaply constructed and is positive in operation.

The bar supporting mechanism utilizes the force of gravity as one of the means for securing the bar in place. The result is accomplished by providing a pivoted hook, the pivot being above the point of support and being located laterally at one side of the stake, whereby the weight of the bar supported in the hook tends to rotate the hook and force the bar inwardly toward the stake.

As an incident in connection with this simple form of supporting means, I provide an arm, preferably integral with the hook, the length of the arm being such that it may act as a gauge or spacer for use in positioning the stake relative to the side form.

As another element of novelty, I provide a pair of wings or lateral webs, attached to the stake at a point intermediate its height for the purpose of stabilizing the stake when placed in soft earth and for acting as a limit stop under all circumstances.

The invention will be more readily understood by reference to the accompanying drawing, in which:

Fig. 1 is a plan view of a bar support and stake constructed in accordance with my invention;

Fig. 2 is a front view thereof;

Fig. 3 is a sectional view of the limit stop, taken on the line 3—3 of Fig. 1;

Fig. 4 is a top view of the stake and bar support.

Fig. 5 is a side elevation of a modification of my invention; and

Fig. 6 is a sectional view taken on the line 6—6 of Fig. 5.

In the drawings and referring particularly to Fig. 1, it will be seen that I provide a stake of generally channel form having a back wall or web, 10, and side flanges, 11, 12. The upper end of the flanges, 11, 12 are provided with notches, 13, and the web, 10 of the stake is extended beyond the upper end of the flanges, forming a tongue, 14 adapted to be bent to overlie the upper ends of the flanges and to close the notches, 13, therein. This tongue therefore, serves the double function of closing the notches and providing a driving head for the stake.

The lower end of the stake may be tapered or pointed as at 15. At a point intermediate the ends of the stake, I provide a limit stop and stabilizer, consisting of a section of sheet metal bent to provide a vertical back wall or web, 16, and horizontal wings or stop members, 17, arranged one over each side of the stake. The back wall, 16, is formed to provide a recess shaped to conform to the cross sectional contour of the stake and is secured thereto in the following manner: The back wall and the stake are apertured, the metal displaced from the aperture in the stake not being separated, but being punched through, thus providing the ears, 18, that are projected through the opening at the back wall and then riveted over the metal of the back wall.

It will be noted that the back wall is bent into diverging lines on the opposite sides of the stake so that the wings, 17, occupy positions in front of the stake. The bar being supported at one side of the center of the stake tends to rotate the stake or tip it forwardly and the wings are for this reason positioned forwardly of the stake and directly beneath the bar in order to offset or neutralize this tendency of tipping.

The bar supporting element comprises a single length of wire bent to provide a hook portion, 19, and a pivot portion 20, the latter occupying the notches, 13, in the upper end of the stake. The free end, 21, of the hook is laterally deflected as bent shown in Fig. 4, in order to insure freedom of contact with the edge of the flange and further to insure a strong frictional contact between the hook and the side of the stake when the stake is being positioned prior to its being driven. It will be noted that the pivot of the hook is at the highest point on the sake and that a bar indicated at 22 in Fig. 1, when received within the hook, tends by its weight, to rotate the hook toward the stake and is, therefore self-securing.

As an incident in connection with the construction disclosed, I may extend an arm, 23, from the pivot, 20 of the hook, the length of the arm being that required as the space between the side forms and the outer bar of the roadway. This arm, 23, may be integral as shown, that is, the arm, the hook and the pivot are formed from a single length of wire.

In case no spacing arm is required, I may prefer to construct the hook as shown in Fig. 5, that is, the hook may be double. In case two bars are required in vertically spaced relation, I may mount a second bar support on the stake as shown in Fig. 5. In that case, the hook, 24, is double, the two hooks being mounted on the pivot, 25. As a means for securing the double hook on the stake, I notch the stake as at 26, preferably through the back wall and then bend the tongue of metal 27 over the notch to confine the pivot of the hooks therein. In case a double hook is used at the upper end instead of the hook and arm, the mounting in the open end of the stake will be the same as that shown in Fig. 1.

The operation is as follows:

For handling and shipping, the arm, 23, will be rotated 270 degrees to the left as viewed in Fig. 1, so that it lies alongside of the stake and parallel thereto. In this position, the stakes may be conveniently nested, a very desirable feature from a shipping standpoint. When ready for installation the arm is rotated to the position of Fig. 1, in which position the arm acts as a gauge for locating the stake relative to the side forms; thereafter the stake is driven until the limit stops, 17 contact with the top surface of the soil. When a bar is to be installed, the arm and hook are swung upwardly sufficiently to open the hook to admit the bar and thereafter swing downwardly into the position of Fig. 1. This is the only operation necessary for holding the bar securely in place.

While the bar holding and spacing elements are shown as composed of wire it will be obvious that metal of other cross section might be utilized and wherever in the claims reference is made to a wire element, it is understood that an equivalent structure is contemplated. Modifications may be made in other features and in the shape of the different parts, all without departure from the spirit of my invention.

I claim:

1. In a device of the class described, the combination of a stake of generally channel form in cross section, and a separate hook composed of wire pivoted for movement transversely across the vertical axis of the stake with the pivot of the hook near the top of the stake.

2. In a device of the class described, the combination of a stake of generally channel form in cross section a separate hook composed of wire pivoted for movement transversely across the vertical axis of the stake with the pivot of the hook near the top of the stake, and a spacing arm pivoted on said stake.

3. In a device of the class described, the combination of a stake of generally channel form in cross section, and a separate hook composed of wire pivoted for movement transversely across the vertical axis of the stake with the pivot of the hook near the top of the stake, and a spacing arm integral with said hook.

4. In a device of the class described, the combination of a sheet metal stake and a wire hook pivoted to the stake, the hook being shaped to receive a reinforcing bar and acting as the sole support for the bar.

5. In a device of the class described, the combination of a stake and a bar support, said support comprising a length of rigid material bent to form a hook and pivoted to the stake to swing in a vertical plane, the free portion of the hook being below the pivot, whereby the weight of a bar supported by said hook tends to swing the hook toward the stake and to urge the bar against the stake.

6. In a device of the class described, the combination of a stake and a bar support and side spacer, said support and spacer comprising a length of wire bent to form a reversely presented hook at one end and a straight arm at the other end with an intervening straight connecting portion, said connecting portion having a pivotal mounting on said stake, the hook being located below the pivot and the opening in the hook being toward the stake.

7. In a device of the class described, the combination of a stake of generally channel form, the web of the channel being extended and bent over the flanges at the top of the stake, a hook confined beneath said bent-over portion of the web and a section of sheet metal bent to provide a pair of wings acting as a limit stop, said stop being secured to the stake at the point intermediate the ends of the latter.

8. In a device of the class described, the combination of a stake of generally channel form, the web of the channel being extended and bent over the flanges at the top of the stake, a hook confined beneath said bent-over portion of the web and a section of sheet metal bent to provide a pair of wings acting as a limit stop, said stop being secured to the stake at the point intermediate the ends of the latter, the wings at each side of the stake being positioned laterally at one side of the stake.

9. In a device of the class described, the combination of a channel stake, the flanges of the channel being notched at the upper end thereof, the web of the stake being extended and adapted to be bent to overlie the ends of the flanges and to close the said notches, and a hook having a pivot adapted to occupy said notches.

In testimony whereof I have affixed my signature.

WILLIAM E. WHITE.